US006831388B1

(12) United States Patent
Leijon et al.

(10) Patent No.: US 6,831,388 B1
(45) Date of Patent: *Dec. 14, 2004

(54) SYNCHRONOUS COMPENSATOR PLANT (75) Inventors: Mats Leijon, Västerås (SE); Bertil Berggren, Västerås (SE)

(73) Assignee: ABB AB, Vasteras (SE)

( * ) Notice: Subject to any disclaimer, the term of this patent is extended or adjusted under 35 U.S.C. 154(b) by 0 days.

This patent is subject to a terminal disclaimer.

(21) Appl. No.: 08/973,017

(22) PCT Filed: May 27, 1997

(86) PCT No.: PCT/SE97/00884

§ 371 (c)(1),
(2), (4) Date: Mar. 25, 1998

(87) PCT Pub. No.: WO97/45922

PCT Pub. Date: Dec. 4, 1997

(30) Foreign Application Priority Data

May 29, 1996 (SE) ................................................ 9602079

(51) Int. Cl.[7] .............................. H02K 3/40; H02K 3/12
(52) U.S. Cl. ....................... 310/196; 310/179; 310/180; 310/195; 174/DIG. 15; 174/DIG. 19; 174/DIG. 29
(58) Field of Search ................................. 310/179, 180, 310/184, 195–196, 198–208, 213, 45, 234; 174/DIG. 13–33, 102 SC, 106 SC; 290/1 R; 361/130

(56) References Cited

U.S. PATENT DOCUMENTS

| 681,800 | A | 9/1901 | Lasche |
| 847,008 | A | 3/1907 | Kitsee |
| 1,304,451 | A | 5/1919 | Burnham |
| 1,418,856 | A | 6/1922 | Williamson |

(List continued on next page.)

FOREIGN PATENT DOCUMENTS

| AU | AT399790 | 7/1995 |
| BE | 565063 | 2/1957 |
| CH | 391071 | 4/1965 |
| CH | 266037 | 10/1965 |

(List continued on next page.)

OTHER PUBLICATIONS

A test installation of a self–tuned ac filter in the Konti–Skan 2 HVDC link, T. Holmgren, G. Asplund, S. Vald marsson, P. Hidman of ABB; U. Jonsson of Svenska Kraftnat; O. Ioof of Vattenfall Vastsverige AB; IEEE Stockholm Power Tech Conference Jun. 1995, pp 64–70.
Analysis of faulted Power Systems; P Anderson, Iowa State University Press/Ames, Iowa, 1973, pp. 255–257.
36–Kv. Generators Arise from Insulation Research; P. Sidler; *Electrical World* Oct. 15, 1932, ppp 524.

(List continued on next page.)

*Primary Examiner*—Burton Mullins
(74) *Attorney, Agent, or Firm*—Dykema Gossett PLLC (57) ABSTRACT

The magnetic circuit of synchronous compensator plant is included in an electric machine which is directly connected to a high supply voltage of 20–800 kV, preferably higher than 36 kV. The electric machine is provided with solid insulation and its winding(s) is/are built up of a cable (6) intended for high voltage comprising one or more current-carrying conductors (31) with a number of strands (36) surrounded by at least one outer and one inner semiconducting layer (34, 32) and intermediate insulating layers (33). The outer semiconducting layer (34) is at earth potential. The phases of the winding are Y-connected, and the Y-point may be insulated and protected from over-voltage by means of surge arresters, or else the Y-point is earthed via a suppression filter. A procedure is used in the manufacture of a synchronous compensator for such plant, in which the cable used is threaded into the openings in the core for the magnetic circuit of the synchronous compensator.

42 Claims, 3 Drawing Sheets

U.S. PATENT DOCUMENTS

| | | |
|---|---|---|
| 1,481,585 A | 1/1924 | Beard |
| 1,508,456 A | 9/1924 | Lenz |
| 1,728,915 A | 9/1929 | Blankenship et al. |
| 1,742,985 A | 1/1930 | Burnham |
| 1,747,507 A | 2/1930 | George |
| 1,756,672 A | 4/1930 | Barr |
| 1,762,775 A | 6/1930 | Ganz |
| 1,781,308 A | 11/1930 | Vos |
| 1,861,182 A | 5/1932 | Hendey et al. |
| 1,904,885 A | 4/1933 | Seeley |
| 1,974,406 A | 9/1934 | Apple et al. |
| 2,006,170 A | 6/1935 | Juhlin |
| 2,206,856 A | 7/1940 | Shearer |
| 2,217,430 A | 10/1940 | Baudry |
| 2,241,832 A | 5/1941 | Wahlquist |
| 2,251,291 A | 8/1941 | Reichelt |
| 2,256,897 A | 9/1941 | Davidson et al. |
| 2,295,415 A | 9/1942 | Monroe |
| 2,409,893 A | 10/1946 | Pendleton et al. |
| 2,415,652 A | 2/1947 | Norton |
| 2,424,443 A | 7/1947 | Evans |
| 2,436,306 A | 2/1948 | Johnson |
| 2,446,999 A | 8/1948 | Camilli |
| 2,459,322 A | 1/1949 | Johnston |
| 2,462,651 A | 2/1949 | Lord |
| 2,498,238 A | 2/1950 | Berberich et al. |
| 2,650,350 A | 8/1953 | Heath |
| 2,721,905 A | 10/1955 | Monroe |
| 2,749,456 A | 6/1956 | Luenberger |
| 2,780,771 A | 2/1957 | Lee |
| 2,846,599 A | 8/1958 | McAdam |
| 2,885,581 A | 5/1959 | Pileggi |
| 2,943,242 A | 6/1960 | Schaschi et al. |
| 2,947,957 A | 8/1960 | Spindler |
| 2,959,699 A | 11/1960 | Smith et al. |
| 2,962,679 A | 11/1960 | Stratton |
| 2,975,309 A | 3/1961 | Seidner |
| 3,014,139 A * | 12/1961 | Shildneck .................. 310/64 |
| 3,098,893 A | 7/1963 | Pringle et al. |
| 3,130,335 A | 4/1964 | Rejda |
| 3,143,269 A | 8/1964 | Van Eldik |
| 3,157,806 A | 11/1964 | Wiedemann |
| 3,158,770 A | 11/1964 | Coggeshall et al. |
| 3,197,723 A | 7/1965 | Dortort |
| 3,268,766 A | 8/1966 | Amos |
| 3,304,599 A | 2/1967 | Nordin |
| 3,354,331 A | 11/1967 | Broeker et al. |
| 3,365,657 A | 1/1968 | Webb |
| 3,372,283 A | 3/1968 | Jaecklin |
| 3,392,779 A | 7/1968 | Tilbrook |
| 3,411,027 A | 11/1968 | Rosenberg |
| 3,418,530 A | 12/1968 | Cheever |
| 3,435,262 A | 3/1969 | Bennett et al. |
| 3,437,858 A | 4/1969 | White |
| 3,444,407 A | 5/1969 | Yates |
| 3,447,002 A | 5/1969 | Ronnevig |
| 3,484,690 A | 12/1969 | Wald |
| 3,541,221 A | 11/1970 | Aupoix et al. |
| 3,560,777 A | 2/1971 | Moeller |
| 3,571,690 A | 3/1971 | Lataisa |
| 3,593,123 A | 7/1971 | Williamson |
| 3,631,519 A | 12/1971 | Salahshourian |
| 3,644,662 A | 2/1972 | Salahshourian |
| 3,651,244 A | 3/1972 | Silver et al. |
| 3,651,402 A | 3/1972 | Leffmann |
| 3,660,721 A | 5/1972 | Baird |
| 3,666,876 A | 5/1972 | Forster |
| 3,670,192 A | 6/1972 | Anderson et al. |
| 3,675,056 A | 7/1972 | Lenz |
| 3,684,821 A | 8/1972 | Miyauchi et al. |
| 3,684,906 A | 8/1972 | Lexz |
| 3,699,238 A | 10/1972 | Hansen et al. |
| 3,716,652 A | 2/1973 | Lusk et al. |
| 3,716,719 A | 2/1973 | Angelery et al. |
| 3,727,085 A | 4/1973 | Goetz et al. |
| 3,740,600 A | 6/1973 | Turley |
| 3,743,867 A | 7/1973 | Smith, Jr. |
| 3,746,954 A | 7/1973 | Myles et al. |
| 3,758,699 A | 9/1973 | Lusk et al. |
| 3,778,891 A | 12/1973 | Amasino et al. |
| 3,781,739 A | 12/1973 | Meyer |
| 3,787,607 A | 1/1974 | Schlafly |
| 3,792,399 A | 2/1974 | McLyman |
| 3,801,843 A | 4/1974 | Corman et al. |
| 3,809,933 A | 5/1974 | Sugawara et al. |
| 3,813,764 A | 6/1974 | Tanaka et al. |
| 3,828,115 A | 8/1974 | Hvizd, Jr. |
| 3,881,647 A | 5/1975 | Wolfe |
| 3,884,154 A | 5/1975 | Marten |
| 3,891,880 A | 6/1975 | Britsch |
| 3,902,000 A | 8/1975 | Forsyth et al. |
| 3,912,957 A | 10/1975 | Reynolds |
| 3,932,779 A | 1/1976 | Madsen |
| 3,932,791 A | 1/1976 | Oswald |
| 3,943,392 A | 3/1976 | Keuper et al. |
| 3,947,278 A | 3/1976 | Youtsey |
| 3,965,408 A | 6/1976 | Higuchi et al. |
| 3,968,388 A | 7/1976 | Lambrecht et al. |
| 3,971,543 A | 7/1976 | Shanahan |
| 3,974,314 A | 8/1976 | Fuchs |
| 3,993,860 A | 11/1976 | Snow et al. |
| 3,995,785 A | 12/1976 | Arick et al. |
| 4,001,616 A | 1/1977 | Lonseth et al. |
| 4,008,367 A | 2/1977 | Sunderhauf |
| 4,008,409 A | 2/1977 | Rhudy et al. |
| 4,031,310 A | 6/1977 | Jachimowicz |
| 4,039,740 A | 8/1977 | Iwata |
| 4,041,431 A | 8/1977 | Enoksen |
| 4,047,138 A | 9/1977 | Steigerwald |
| 4,064,419 A | 12/1977 | Peterson |
| 4,084,307 A | 4/1978 | Schultz et al. |
| 4,085,347 A | 4/1978 | Lichius |
| 4,088,953 A | 5/1978 | Sarian |
| 4,091,138 A | 5/1978 | Takagi et al. |
| 4,091,139 A * | 5/1978 | Quirk .................... 428/244 |
| 4,099,227 A | 7/1978 | Liptak |
| 4,103,075 A | 7/1978 | Adam |
| 4,106,069 A | 8/1978 | Trautner et al. |
| 4,107,092 A | 8/1978 | Carnahan et al. |
| 4,109,098 A * | 8/1978 | Olsson et al. ............... 174/106 |
| 4,121,148 A | 10/1978 | Platzer |
| 4,132,914 A | 1/1979 | Khutoretsky et al. |
| 4,134,036 A | 1/1979 | Curtiss |
| 4,134,055 A | 1/1979 | Akamatsu |
| 4,134,146 A * | 1/1979 | Stetson ..................... 361/130 |
| 4,149,101 A | 4/1979 | Lesokhin et al. |
| 4,152,615 A | 5/1979 | Calfo et al. |
| 4,160,193 A | 7/1979 | Richmond |
| 4,164,672 A | 8/1979 | Flick |
| 4,164,772 A | 8/1979 | Hingorani |
| 4,177,397 A | 12/1979 | Lill |
| 4,177,418 A | 12/1979 | Brueckner et al. |
| 4,184,186 A | 1/1980 | Barkan |
| 4,200,817 A | 4/1980 | Bratoljic |
| 4,200,818 A | 4/1980 | Ruffing et al. |
| 4,206,434 A | 6/1980 | Hase |
| 4,207,427 A | 6/1980 | Beretta et al. |
| 4,207,482 A | 6/1980 | Neumeyer et al. |
| 4,208,597 A | 6/1980 | Mulach et al. |
| 4,229,721 A | 10/1980 | Koloczek et al. |
| 4,238,339 A | 12/1980 | Khutoretsky et al. |

| | | | | | |
|---|---|---|---|---|---|
| 4,239,999 A | 12/1980 | Vinokurov et al. | 4,615,109 A | 10/1986 | Wcislo et al. |
| 4,245,182 A | 1/1981 | Aotsu et al. | 4,615,778 A | 10/1986 | Elton |
| 4,246,694 A | 1/1981 | Raschbichler et al. | 4,618,795 A | 10/1986 | Cooper et al. |
| 4,255,684 A | 3/1981 | Mischler et al. | 4,619,040 A | 10/1986 | Wang et al. |
| 4,258,280 A | 3/1981 | Starcevic | 4,622,116 A | 11/1986 | Elton et al. |
| 4,262,209 A | 4/1981 | Berner | 4,633,109 A | 12/1986 | Feigel |
| 4,274,027 A | 6/1981 | Higuchi et al. | 4,650,924 A | 3/1987 | Kauffman et al. |
| 4,281,264 A | 7/1981 | Keim et al. | 4,652,963 A | 3/1987 | Fahlen |
| 4,307,311 A | 12/1981 | Grozinger | 4,656,379 A | 4/1987 | McCarty |
| 4,308,476 A * | 12/1981 | Schuler .................. 310/45 | 4,677,328 A | 6/1987 | Kumakura |
| 4,308,575 A | 12/1981 | Mase | 4,687,882 A | 8/1987 | Stone et al. |
| 4,310,966 A | 1/1982 | Brietenbach | 4,692,731 A | 9/1987 | Osinga |
| 4,314,168 A | 2/1982 | Breitenbach | 4,723,083 A | 2/1988 | Elton |
| 4,317,001 A | 2/1982 | Silver et al. | 4,723,104 A | 2/1988 | Rohatyn |
| 4,320,645 A | 3/1982 | Stanley | 4,724,345 A | 2/1988 | Elton et al. |
| 4,321,426 A | 3/1982 | Schaeffer et al. | 4,732,412 A | 3/1988 | van der Linden et al. |
| 4,321,518 A | 3/1982 | Akamatsu | 4,737,704 A | 4/1988 | Kalinnikov et al. |
| 4,330,726 A | 5/1982 | Albright et al. | 4,745,314 A | 5/1988 | Nakano |
| 4,337,922 A | 7/1982 | Streiff et al. | 4,761,602 A | 8/1988 | Leibovich |
| 4,341,989 A | 7/1982 | Sandberg et al. | 4,766,365 A | 8/1988 | Bolduc et al. |
| 4,347,449 A | 8/1982 | Beau | 4,771,168 A | 9/1988 | Gundersen et al. |
| 4,347,454 A | 8/1982 | Gellert et al. | 4,785,138 A | 11/1988 | Brietenbach et al. |
| 4,357,542 A | 11/1982 | Kirschbaum | 4,795,933 A | 1/1989 | Sakai |
| 4,360,748 A | 11/1982 | Raschbichler et al. | 4,827,172 A | 5/1989 | Kobayashi |
| 4,361,723 A | 11/1982 | Hvizd, Jr. et al. | 4,845,308 A | 7/1989 | Womack, Jr. et al. |
| 4,363,612 A | 12/1982 | Walchhutter | 4,847,747 A | 7/1989 | Abbondanti |
| 4,365,178 A | 12/1982 | Lexz | 4,853,565 A | 8/1989 | Elton et al. |
| 4,367,425 A | 1/1983 | Mendelsohn et al. | 4,859,810 A | 8/1989 | Cloetens et al. |
| 4,367,890 A | 1/1983 | Spirk | 4,859,989 A | 8/1989 | McPherson |
| 4,368,418 A | 1/1983 | Demello et al. | 4,860,430 A | 8/1989 | Raschbichler et al. |
| 4,369,389 A | 1/1983 | Lambrecht | 4,864,266 A | 9/1989 | Feather et al. |
| 4,371,745 A | 2/1983 | Sakashita | 4,883,230 A | 11/1989 | Lindstrom |
| 4,384,944 A | 5/1983 | Silver et al. | 4,890,040 A | 12/1989 | Gundersen |
| 4,387,316 A | 6/1983 | Katsekas | 4,894,284 A | 1/1990 | Yamanouchi et al. |
| 4,401,920 A | 8/1983 | Taylor et al. | 4,914,386 A | 4/1990 | Zocholl |
| 4,403,163 A | 9/1983 | Rarmerding et al. | 4,918,347 A | 4/1990 | Takaba |
| 4,404,486 A | 9/1983 | Keim et al. | 4,918,835 A | 4/1990 | Raschbichler et al. |
| 4,411,710 A | 10/1983 | Mochizuki et al. | 4,924,342 A | 5/1990 | Lee |
| 4,421,284 A | 12/1983 | Pan | 4,926,079 A | 5/1990 | Niemela et al. |
| 4,425,521 A | 1/1984 | Rosenberry, Jr. et al. | 4,942,326 A | 7/1990 | Butler, III et al. |
| 4,426,771 A | 1/1984 | Wang et al. | 4,949,001 A | 8/1990 | Campbell |
| 4,429,244 A * | 1/1984 | Nikitin et al. ............ 310/254 | 4,982,147 A | 1/1991 | Lauw |
| 4,431,960 A | 2/1984 | Zucker | 4,994,952 A | 2/1991 | Silva et al. |
| 4,432,029 A | 2/1984 | Lundqvist | 4,997,995 A | 3/1991 | Simmons et al. |
| 4,437,464 A | 3/1984 | Crow | 5,012,125 A | 4/1991 | Conway |
| 4,443,725 A | 4/1984 | Derderian et al. | 5,030,813 A | 7/1991 | Stanisz |
| 4,470,884 A | 9/1984 | Carr | 5,036,165 A | 7/1991 | Elton et al. |
| 4,473,765 A | 9/1984 | Butman, Jr. et al. | 5,036,238 A | 7/1991 | Tajima |
| 4,475,075 A | 10/1984 | Munn | 5,066,881 A | 11/1991 | Elton et al. |
| 4,477,690 A | 10/1984 | Nikitin et al. | 5,067,046 A | 11/1991 | Elton et al. |
| 4,481,438 A | 11/1984 | Keim | 5,083,360 A | 1/1992 | Valencic et al. |
| 4,484,106 A | 11/1984 | Taylor et al. | 5,086,246 A | 2/1992 | Dymond et al. |
| 4,488,079 A | 12/1984 | Dailey et al. | 5,091,609 A | 2/1992 | Sawada et al. |
| 4,490,651 A | 12/1984 | Taylor et al. | 5,094,703 A * | 3/1992 | Takaoka et al. ............ 148/269 |
| 4,503,284 A | 3/1985 | Minnick et al. | 5,095,175 A | 3/1992 | Yoshida et al. |
| 4,508,251 A | 4/1985 | Harada et al. | 5,097,241 A | 3/1992 | Smith et al. |
| 4,510,077 A | 4/1985 | Elton | 5,097,591 A | 3/1992 | Wcislo et al. |
| 4,517,471 A | 5/1985 | Sachs | 5,111,095 A | 5/1992 | Hendershot |
| 4,520,287 A | 5/1985 | Wang et al. | 5,124,607 A | 6/1992 | Rieber et al. |
| 4,523,249 A | 6/1985 | Arimoto | 5,136,459 A | 8/1992 | Fararooy |
| 4,538,131 A | 8/1985 | Baier et al. | 5,140,290 A | 8/1992 | Dersch |
| 4,546,210 A | 10/1985 | Akiba et al. | 5,153,460 A | 10/1992 | Bovino et al. |
| 4,551,780 A | 11/1985 | Canay | 5,168,662 A | 12/1992 | Nakamura et al. |
| 4,557,038 A | 12/1985 | Wcislo et al. | 5,171,941 A | 12/1992 | Shimizu et al. |
| 4,560,896 A | 12/1985 | Vogt et al. | 5,182,537 A | 1/1993 | Thuis |
| 4,565,929 A | 1/1986 | Baskin et al. | 5,187,428 A | 2/1993 | Hutchison et al. |
| 4,571,453 A | 2/1986 | Takaoka et al. | 5,231,249 A | 7/1993 | Kimura et al. |
| 4,588,916 A | 5/1986 | Lis | 5,235,488 A | 8/1993 | Koch |
| 4,590,416 A | 5/1986 | Porche et al. | 5,246,783 A | 9/1993 | Spenadel et al. |
| 4,594,630 A | 6/1986 | Rabinowitz et al. | 5,264,778 A | 11/1993 | Kimmel et al. |
| 4,607,183 A | 8/1986 | Rieber et al. | 5,287,262 A | 2/1994 | Klein |

| | | | | | |
|---|---|---|---|---|---|
| 5,304,883 A | 4/1994 | Denk | DE | 719009 | 3/1942 |
| 5,305,961 A | 4/1994 | Errard et al. | DE | 846583 | 8/1952 |
| 5,321,308 A | 6/1994 | Johncock | DE | 875227 | 4/1953 |
| 5,323,330 A | 6/1994 | Asplund et al. | DE | 975999 | 1/1963 |
| 5,325,008 A | 6/1994 | Grant | DE | 1465719 | 5/1969 |
| 5,325,259 A | 6/1994 | Paulsson | DE | 1807391 | 5/1970 |
| 5,327,637 A | 7/1994 | Brietenbach et al. | DE | 2050674 | 5/1971 |
| 5,341,281 A | 8/1994 | Skibinski | DE | 1638176 | 6/1971 |
| 5,343,139 A | 8/1994 | Gyugyi et al. | DE | 2155371 | 5/1973 |
| 5,355,046 A | 10/1994 | Weigelt | DE | 2400698 | 7/1975 |
| 5,365,132 A | 11/1994 | Hann et al. | DE | 2520511 | 11/1976 |
| 5,387,890 A | 2/1995 | Estop et al. | DE | 2656389 | 6/1978 |
| 5,397,513 A | 3/1995 | Steketee, Jr. | DE | 2721905 | 11/1978 |
| 5,399,941 A | 3/1995 | Grothaus et al. | DE | 137164 | 8/1979 |
| 5,400,005 A | 3/1995 | Bobry | DE | 138840 | 11/1979 |
| 5,408,169 A | 4/1995 | Jeanneret | DE | 2824951 | 12/1979 |
| 5,449,861 A | 9/1995 | Fujino et al. | DE | 2835386 | 2/1980 |
| 5,452,170 A | 9/1995 | Ohde et al. | DE | 2839517 | 3/1980 |
| 5,468,916 A | 11/1995 | Litenas et al. | DE | 2854520 | 6/1980 |
| 5,499,178 A | 3/1996 | Mohan | DE | 3009102 | 9/1980 |
| 5,500,632 A | 3/1996 | Halser, III | DE | 2913697 | 10/1980 |
| 5,510,942 A | 4/1996 | Bock et al. | DE | 2920478 | 12/1980 |
| 5,530,307 A | 6/1996 | Horst | DE | 3028777 | 3/1981 |
| 5,533,658 A | 7/1996 | Benedict et al. | DE | 2939004 | 4/1981 |
| 5,534,754 A | 7/1996 | Poumey | DE | 3006382 | 8/1981 |
| 5,545,853 A | 8/1996 | Hildreth | DE | 3008818 | 9/1981 |
| 5,550,410 A | 8/1996 | Titus | DE | 209313 | 4/1984 |
| 5,583,387 A | 12/1996 | Takeuchi et al. | DE | 3305225 | 8/1984 |
| 5,587,126 A | 12/1996 | Steketee, Jr. | DE | 3309051 | 9/1984 |
| 5,598,137 A | 1/1997 | Alber et al. | DE | 3441311 | 5/1986 |
| 5,607,320 A | 3/1997 | Wright | DE | 3543106 | 6/1987 |
| 5,612,510 A | 3/1997 | Hildreth | DE | 2917717 | 8/1987 |
| 5,663,605 A | 9/1997 | Evans et al. | DE | 3612112 | 10/1987 |
| 5,672,926 A | 9/1997 | Brandes et al. | DE | 3726346 | 2/1989 |
| 5,689,223 A | 11/1997 | Demarmels et al. | DE | 3925337 | 2/1991 |
| 5,807,447 A | 9/1998 | Forrest | DE | 4023903 | 11/1991 |
| 5,834,699 A | 11/1998 | Buck et al. | DE | 4022476 | 1/1992 |
| | | | DE | 4233558 | 3/1994 |
| | FOREIGN PATENT DOCUMENTS | | DE | 4402184 | 8/1995 |
| CH | 534448 | 2/1973 | DE | 4409794 | 8/1995 |
| CH | 539328 | 7/1973 | DE | 4412761 | 10/1995 |
| CH | 646403 | 2/1979 | DE | 4420322 | 12/1995 |
| CH | 657482 | 8/1986 | DE | 4438186 | 5/1996 |
| CH | 1189322 | 10/1986 | DE | 19020222 | 3/1997 |
| DE | 40414 | 8/1887 | DE | 19547229 | 6/1997 |
| DE | 277012 | 7/1914 | DE | 468827 | 7/1997 |
| DE | 336418 | 6/1920 | DE | 19620906 | 1/1998 |
| DE | 372390 | 3/1923 | DE | 134022 | 12/2001 |
| DE | 386561 | 12/1923 | EP | 049104 | 4/1982 |
| DE | 387973 | 1/1924 | EP | 0493704 | 4/1982 |
| DE | 406371 | 11/1924 | EP | 078908 | 5/1983 |
| DE | 425551 | 2/1926 | EP | 0120154 | 10/1984 |
| DE | 426793 | 3/1926 | EP | 0130124 | 1/1985 |
| DE | 432169 | 7/1926 | EP | 0142813 | 5/1985 |
| DE | 433749 | 9/1926 | EP | 0155405 | 9/1985 |
| DE | 435608 | 10/1926 | EP | 0102513 | 1/1986 |
| DE | 435609 | 10/1926 | EP | 0174783 | 3/1986 |
| DE | 441717 | 3/1927 | EP | 0185788 | 7/1986 |
| DE | 443011 | 4/1927 | EP | 0277358 | 8/1986 |
| DE | 460124 | 5/1928 | EP | 0234521 | 9/1987 |
| DE | 482506 | 9/1929 | EP | 0244069 | 11/1987 |
| DE | 501181 | 7/1930 | EP | 0246377 | 11/1987 |
| DE | 523047 | 4/1931 | EP | 0265868 | 5/1988 |
| DE | 568508 | 1/1933 | EP | 0274691 | 7/1988 |
| DE | 572030 | 3/1933 | EP | 0280759 | 9/1988 |
| DE | 584639 | 9/1933 | EP | 0282876 | 9/1988 |
| DE | 586121 | 10/1933 | EP | 0309096 | 3/1989 |
| DE | 604972 | 11/1934 | EP | 0314860 | 5/1989 |
| DE | 629301 | 4/1936 | EP | 0316911 | 5/1989 |
| DE | 468827 | * 2/1937 ................ 310/179 | EP | 0317248 | 5/1989 |
| DE | 673545 | 3/1939 | EP | 0335430 | 10/1989 |

| | | | | | |
|---|---|---|---|---|---|
| EP | 0342554 | 11/1989 | GB | 1059123 | 2/1967 |
| EP | 0221404 | 5/1990 | GB | 1103098 | 2/1968 |
| EP | 0375101 | 6/1990 | GB | 1103099 | 2/1968 |
| EP | 0406437 | 1/1991 | GB | 1117401 | 6/1968 |
| EP | 0439410 | 7/1991 | GB | 1135242 | 12/1968 |
| EP | 0440865 | 8/1991 | GB | 1147049 | 4/1969 |
| EP | 0469155 A1 | 2/1992 | GB | 1157885 | 7/1969 |
| EP | 0490705 | 6/1992 | GB | 1174659 | 12/1969 |
| EP | 0503817 | 9/1992 | GB | 1236082 | 6/1971 |
| EP | 0571155 | 11/1993 | GB | 1268770 | 3/1972 |
| EP | 0620570 | 10/1994 | GB | 1340983 | 12/1973 |
| EP | 0620630 | 10/1994 | GB | 1341050 | 12/1973 |
| EP | 0642027 | 3/1995 | GB | 1365191 | 8/1974 |
| EP | 0671632 | 9/1995 | GB | 1395152 | 5/1975 |
| EP | 0676777 | 10/1995 | GB | 1424982 | 2/1976 |
| EP | 0677915 | 10/1995 | GB | 1426594 | 3/1976 |
| EP | 0684679 | 11/1995 | GB | 1438610 | 6/1976 |
| EP | 0684682 | 11/1995 | GB | 1445284 | 8/1976 |
| EP | 0695019 | 1/1996 | GB | 1479904 | 7/1977 |
| EP | 0732787 | 9/1996 | GB | 1493163 | 11/1977 |
| EP | 0738034 | 10/1996 | GB | 1502938 | 3/1978 |
| EP | 0739087 A2 | 10/1996 | GB | 1525745 | 9/1978 |
| EP | 0740315 | 10/1996 | GB | 2000625 | 1/1979 |
| EP | 0749190 A2 | 12/1996 | GB | 1548633 | 7/1979 |
| EP | 0751605 | 1/1997 | GB | 2046142 | 11/1979 |
| EP | 0739087 A3 | 3/1997 | GB | 2022327 | 12/1979 |
| EP | 0749193 A3 | 3/1997 | GB | 2025150 | 1/1980 |
| EP | 0780926 | 6/1997 | GB | 2034101 | 5/1980 |
| EP | 0802542 | 10/1997 | GB | 1574796 | 9/1980 |
| EP | 0913912 A1 | 5/1999 | GB | 2070470 | 9/1981 |
| FR | 805544 | 4/1936 | GB | 2071433 | 9/1981 |
| FR | 841351 | 1/1938 | GB | 2081523 | 2/1982 |
| FR | 847899 | 12/1938 | GB | 2099635 | 12/1982 |
| FR | 916959 | 12/1946 | GB | 2105925 | 3/1983 |
| FR | 1011924 | 4/1949 | GB | 2106306 | 4/1983 |
| FR | 1126975 | 3/1955 | GB | 2106721 | 4/1983 |
| FR | 1238795 | 7/1959 | GB | 2136214 | 9/1984 |
| FR | 2108171 | 5/1972 | GB | 2140195 | 11/1984 |
| FR | 2251938 | 6/1975 | GB | 2150153 | 6/1985 |
| FR | 2305879 | 10/1976 | GB | 2268337 | 1/1994 |
| FR | 2376542 | 7/1978 | GB | 2273819 | 6/1994 |
| FR | 2467502 | 4/1981 | GB | 2283133 | 4/1995 |
| FR | 2481531 | 10/1981 | GB | 2289992 | 12/1995 |
| FR | 2556146 | 6/1985 | GB | 2308490 | 6/1997 |
| FR | 2594271 | 8/1987 | GB | 2332557 | 6/1999 |
| FR | 2708157 | 1/1995 | HU | 175494 | 11/1981 |
| GB | 123906 | 3/1919 | JP | 60206121 | 3/1959 |
| GB | 268271 | 3/1927 | JP | 57043529 | 8/1980 |
| GB | 293861 | 11/1928 | JP | 57126117 | 5/1982 |
| GB | 292999 | 4/1929 | JP | 59076156 | 10/1982 |
| GB | 319313 | 7/1929 | JP | 59159642 | 2/1983 |
| GB | 518993 | 3/1940 | JP | 6264964 | 9/1985 |
| GB | 537609 | 6/1941 | JP | 1129737 | 5/1989 |
| GB | 540456 | 10/1941 | JP | 62320631 | 6/1989 |
| GB | 589071 | 6/1947 | JP | 2017474 | 1/1990 |
| GB | 666883 | 2/1952 | JP | 3245748 | 2/1990 |
| GB | 685416 | 1/1953 | JP | 4179107 | 11/1990 |
| GB | 702892 | 1/1954 | JP | 318253 | 1/1991 |
| GB | 715226 | 9/1954 | JP | 424909 | 1/1992 |
| GB | 723457 | 2/1955 | JP | 5290947 | 4/1992 |
| GB | 739962 | 11/1955 | JP | 6196343 | 12/1992 |
| GB | 763761 | 12/1956 | JP | 6233442 | 2/1993 |
| GB | 805721 | 12/1958 | JP | 6325629 | 5/1993 |
| GB | 827600 | 2/1960 | JP | 7057951 | 8/1993 |
| GB | 854728 | 11/1960 | JP | 7264789 | 3/1994 |
| GB | 870583 | 6/1961 | JP | 8167332 | 12/1994 |
| GB | 913386 | 12/1962 | JP | 7161270 | 6/1995 |
| GB | 965741 | 8/1964 | JP | 8264039 | 11/1995 |
| GB | 992249 | 5/1965 | JP | 9200989 | 1/1996 |
| GB | 1024583 | 3/1966 | JP | 8036952 | 2/1996 |
| GB | 1053337 | 12/1966 | JP | 8167360 | 6/1996 |

| | | | | | | |
|---|---|---|---|---|---|---|
| LU | 67199 | 3/1972 | | WO | WO9745937 | 12/1997 |
| SE | 90308 | 9/1937 | | WO | WO9745938 | 12/1997 |
| SE | 305899 | 11/1968 | | WO | WO9745939 | 12/1997 |
| SE | 255156 | 2/1969 | | WO | WO9747067 | 12/1997 |
| SE | 341428 | 12/1971 | | WO | WO9820595 | 5/1998 |
| SE | 453236 | 1/1982 | | WO | WO9820596 | 5/1998 |
| SE | 457792 | 6/1987 | | WO | WO9820597 | 5/1998 |
| SE | 502417 | 12/1993 | | WO | WO9820600 | 5/1998 |
| SU | 792302 | 1/1971 | | WO | WO9821385 | 5/1998 |
| SU | 425268 | 9/1974 | | WO | PCT/FR 98/00468 | 6/1998 |
| SU | 1019553 | 1/1980 | | WO | WO9827634 | 6/1998 |
| SU | 694939 | 1/1982 | | WO | WO9827635 | 6/1998 |
| SU | 955369 | 8/1983 | | WO | WO9827636 | 6/1998 |
| SU | 1511810 | 5/1987 | | WO | WO9834315 | 6/1998 |
| WO | WO8202617 | 8/1982 | | WO | WO9829927 | 7/1998 |
| WO | WO8502302 | 5/1985 | | WO | WO9829928 | 7/1998 |
| WO | WO9011389 | 10/1990 | | WO | WO9829929 | 7/1998 |
| WO | WO9012409 | 10/1990 | | WO | WO9829930 | 7/1998 |
| WO | PCT/DE 90/00279 | 11/1990 | | WO | WO9829931 | 7/1998 |
| WO | WO9101059 | 1/1991 | | WO | WO9829932 | 7/1998 |
| WO | WO9101585 | 2/1991 | | WO | WO9833731 | 8/1998 |
| WO | WO9107807 | 3/1991 | | WO | WO9833736 | 8/1998 |
| WO | PCT SE 91/00077 | 4/1991 | | WO | WO9833737 | 8/1998 |
| WO | WO9109442 | 6/1991 | | WO | WO9834238 | 8/1998 |
| WO | WO 91/11841 | 8/1991 | | WO | WO9834240 | 8/1998 |
| WO | WO8115862 | 10/1991 | | WO | WO9834241 | 8/1998 |
| WO | WO 91/15755 | 10/1991 | | WO | WO9834242 | 8/1998 |
| WO | WO9201328 | 1/1992 | | WO | WO9834243 | 8/1998 |
| WO | WO9203870 | 3/1992 | | WO | WO9834244 | 8/1998 |
| WO | WO9321681 | 10/1993 | | WO | WO9834245 | 8/1998 |
| WO | WO9406194 | 3/1994 | | WO | WO9834246 | 8/1998 |
| WO | WO9518058 | 7/1995 | | WO | WO9834247 | 8/1998 |
| WO | WO9522153 | 8/1995 | | WO | WO9834248 | 8/1998 |
| WO | WO9524049 | 9/1995 | | WO | WO9834249 | 8/1998 |
| WO | WO9622606 | 7/1996 | | WO | WO9834250 | 8/1998 |
| WO | WO9622607 | 7/1996 | | WO | WO9834309 | 8/1998 |
| WO | PCT/CN 96/0010 | 10/1996 | | WO | WO9834312 | 8/1998 |
| WO | WO9630144 | 10/1996 | | WO | WO9834321 | 8/1998 |
| WO | WO9710640 | 3/1997 | | WO | WO9834322 | 8/1998 |
| WO | WO9711831 | 4/1997 | | WO | WO9834323 | 8/1998 |
| WO | WO9716881 | 5/1997 | | WO | WO9834325 | 8/1998 |
| WO | WO 97/45908 | 5/1997 | | WO | WO9834326 | 8/1998 |
| WO | WO 97/29494 | 8/1997 | | WO | WO9834327 | 8/1998 |
| WO | WO9745288 | 12/1997 | | WO | WO9834328 | 8/1998 |
| WO | WO9745847 | 12/1997 | | WO | WO9834329 | 8/1998 |
| WO | WO9745848 | 12/1997 | | WO | WO9834330 | 8/1998 |
| WO | WO9745906 | 12/1997 | | WO | WO9834331 | 8/1998 |
| WO | WO9745907 | 12/1997 | | WO | WO 98/40627 | 9/1998 |
| WO | WO9745912 | 12/1997 | | WO | WO 98/43336 | 10/1998 |
| WO | WO9745914 | 12/1997 | | WO | WO9917309 | 4/1999 |
| WO | WO9745915 | 12/1997 | | WO | WO9917311 | 4/1999 |
| WO | WO9745916 | 12/1997 | | WO | WO9917312 | 4/1999 |
| WO | WO9745918 | 12/1997 | | WO | WO9917313 | 4/1999 |
| WO | WO9745919 | 12/1997 | | WO | WO9917314 | 4/1999 |
| WO | WO9745920 | 12/1997 | | WO | WO9917315 | 4/1999 |
| WO | WO9745921 | 12/1997 | | WO | WO9917316 | 4/1999 |
| WO | WO9745922 | 12/1997 | | WO | WO9917422 | 4/1999 |
| WO | WO9745923 | 12/1997 | | WO | WO9917424 | 4/1999 |
| WO | WO9745924 | 12/1997 | | WO | WO9917425 | 4/1999 |
| WO | WO9745925 | 12/1997 | | WO | WO9917426 | 4/1999 |
| WO | WO9745926 | 12/1997 | | WO | WO9917427 | 4/1999 |
| WO | WO9745927 | 12/1997 | | WO | Wo9917428 | 4/1999 |
| WO | WO9745928 | 12/1997 | | WO | WO9917429 | 4/1999 |
| WO | WO9745929 | 12/1997 | | WO | WO9917432 | 4/1999 |
| WO | WO9745930 | 12/1997 | | WO | WO9917433 | 4/1999 |
| WO | WO9745931 | 12/1997 | | WO | WO9919963 | 4/1999 |
| WO | WO9745932 | 12/1997 | | WO | WO9919969 | 4/1999 |
| WO | WO9745933 | 12/1997 | | WO | WO9919970 | 4/1999 |
| WO | WO9745934 | 12/1997 | | WO | PCT/SE 98/02148 | 6/1999 |
| WO | WO9745935 | 12/1997 | | WO | WO9927546 | 6/1999 |
| WO | WO9745936 | 12/1997 | | WO | WO9928919 | 6/1999 |

| | | |
|---|---|---|
| WO | WO9928921 | 6/1999 |
| WO | WO9928923 | 6/1999 |
| WO | WO9928924 | 6/1999 |
| WO | WO9928925 | 6/1999 |
| WO | WO9928926 | 6/1999 |
| WO | WO9928927 | 6/1999 |
| WO | WO9928928 | 6/1999 |
| WO | WO9928929 | 6/1999 |
| WO | WO9928930 | 6/1999 |
| WO | WO9928931 | 6/1999 |
| WO | WO9928934 | 6/1999 |
| WO | WO9928994 | 6/1999 |
| WO | WO9929005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO9929024 | 6/1999 |
| WO | WO9929026 | 6/1999 |
| WO | WO9929029 | 6/1999 |
| WO | WO9929034 | 6/1999 |

OTHER PUBLICATIONS

Oil Water cooled 300 MW turbine generator,L.P. Gnedin et al;*Elektrotechnika,* 1970, pp 6–8.

J&P Transformer Book 11$^{th}$ Edition;A. C. Franklin et al;owned by Butterworth—Heinemann Ltd, Oxford Printed by Hartnolls Ltd in Great Britain 1983, pp29–67.

Transformerboard; H.P. Moser et al; 1979, pp 1–19.

The Skagerrak transmission—the world's longest HVDC submarine cable link; L. Haglof et al of ASEA; ASEA Journal vol. 53, No. 1–2, 1980, pp 3–12.

Direct Connection of Generators to HDVC Converters: Main Characteristics and Comparative Advantages; J.Arrillaga et al; *Electra* No. 149, Aug. 1993, pp 19–37.

Our flexible friend article; M. Judge; *New Scientist,* May 10, 1997, pp. 44–48.

In–Service Performance of HVDC Converter transformers and oil–cooled smoothing reactors; G.L. Desilets et al; *Electra* No. 155, Aug. 1994, pp 7–29.

Transformateurs a courant continu haute tension–examen des specifications; A. Lindroth et al; *Electra* No. 141, Apr. 1992, pp 34–39.

Development of a Termination for the 77 kV–Class High Tc Superconducting Power Cable; T. Shimonosono et al; IEEE Power Delivery, vol. 12, No. 1, Jan. 1997, pp. 33–38.

Verification of Limiter Performance in Modern Excitation Control Systems; G. K. Girgis et al; IEEE Energy Conservation, vol. 10, No. 3, Sep. 1995, pp 538–542.

A High Initial response Brushless Excitation System; T. L. Dillman et al; IEEE Power Generation Winter Meeting Proceedings, Jan. 31, 1971, pp 2089–2094.

Design, manufacturing and cold test of a superconducting coil and its cryostat for SMES applications; A. Bautista et al; IEEE Applied Superconductivity, vol. 7, No. 2, Jun. 1997, pp 853–856.

Quench Protection and Stagnant Normal Zones in a Large Cryostable SMES; Y. Lvovsky et al; IEEE Applied Superconductivity, vol. 7, No. 2, Jun. 1997, pp 857–860.

Design and Construction of the 4 Tesla Background Coil for the Navy SMES Cable Test Apparatus; D.W. Scherbarth et al; IEEE Applied Superconductivity, vol. 7, No. 2, Jun. 1997, pp 840–843.

High Speed Synchronous Motors Adjustable Speed Drives; ASEA Generation Pamphlet OG 135–101 E, Jan. 1985, pp 1–4.

Billig burk motar overtonen; A. Felldin; *ERA (Teknik)* Aug. 1994, pp 26–28.

400–kV XLPE cable system passes CIGRE test; ABB Article; ABB Review Sep. 1995, pp 38.

FREQSYN—a new drive system for high power applications;J–A. Bergman et al; ASEA Journal 59, Apr. 1986, pp16–19.

Canadians Create Conductive Concrete; J. Beaudoin et al; *Science,* vol. 276, May 23, 1997, pp 1201.

Fully Water–Cooled 190 MVA Generators in the Tonstad Hydroelectric Power Station; E. Ostby et al; BBC Review Aug. 1969, pp 380–385.

Relocatable static var compensators help control unbundled power flows; R. C. Knight et al; *Transmission & Distribution,* Dec. 1996, pp 49–54.

Investigation and Use of Asynchronized Machines in Power Systems*; N.I.Blotskii et al; *Elektrichestvo,* No. 12, 1–6, 1985, pp 90–99.

Variable–speed switched reluctance motors; P.J. Lawrenson et al;IEE proc. vol. 127, Pt.B, No. 4, Jul. 1980, pp. 253–265.

Das Einphasenwechselstromsystem hoherer Frequenz; J.G. Heil; Elektrische Bahnen ed; Dec. 1987, pp 388–389.

Power Transmission by Direct Current;E. Uhlmann;ISBN 3–540–07122–9 Springer–Verlag, Berlin/Heidelberg/New York; 1975, pp. 327–328.

Elektriska Maskiner; F. Gustavson; Institute for Elkreafteknilk, KTH; Stockholm, 1996, pp 3–6–3–12.

Die Wechselstromtechnik; A. Cour' Springer Verlag, Germany; 1936, pp 586–598.

Insulation systems for superconducting transmission cables; O. Toennesen; Nordic Insulation Symposium, Bergen, 1996, pp 424–432.

MPTC: An economical alternative to universal power flow controllers; N. Mohan; EPE 1997, Trondheim, pp 3.1027–3.1030.

Lexikon der Technik; Luger; Band 2, Grundlagen der Elektrotechnik und Kerntechnik, 1960, pp 395.

Das Handbuch der Lokomotiven (hungarian locomotive V40 1 'D'); B. Hollingsworth et al; Pawlak Verlagsgesellschaft; 1933, pp. 254–255.

Synchronous machines with single or double 3–phase star–connected winding fed by 12–pulse load commutated inverter. Simulation of operational behaviour; C. Ivarson et al; ICEM 1994, International Conference on electrical machines, vol. 1, pp 267–272.

Elkrafthandboken, Elmaskiner; A. Rejminger; Elkrafthandboken, Elmaskiner 1996, 15–20.

Power Electronics—in Theory and Practice; K. Thorborg; ISBN 0–86238–341–2, 1993, pp 1–13.

Regulating transformers in power systems—new concepts and applications; E. Wirth et al; ABB Review Apr. 1997, p 12–20.

Transforming transformers; S. Mehta et al; *IEEE Spectrum,* Jul. 1997, pp. 43–49.

A study of equipment sizes and constraints for a unified power flow controller; J. Blan et al; IEEE Transactions on Power Delivery, vol. 12, No. 3, Jul. 1997, pp. 1385–1391.
Industrial High Voltage; F.H. Kreuger; *Industrial High Voltage* 1991 vol. I, pp. 113–117.
Hochspannungstechnik; A. Küchler; Hochspannungstechnik, VDI Verlag 1996, pp. 365–366, ISBN 3–18–401530–0 or 3–540–62070–2.
High Voltage Engineering; N.S. Naidu; High Voltage Engineering, second edition 1995 ISBN 0–07–462286–2, Chapter 5, pp91–98.
Performance Characteristics of a Wide Range Induction Type Frequency Converter; G.A. Ghoneem; Ieema Journal, Sep. 1995, pp 21–34.
International Electrotechnical Vocabulary, Chapter 551 Power Electronics;unknown author; International Electrotechnical Vocabulary Chapter 551: Power Electronics Bureau Central de la Commission Electrotechnique Internationale, Geneve; 1982, pp1–65.
Design and manufacture of a large superconducting homopolar motor; A.D. Appleton; IEEE Transactions on Magnetics, vol. 19,No. 3, Part 2, May 1983, pp 1048–1050.
Application of high temperature superconductivity to electric motor design; J.S. Edmonds et al; IEEE Transactions on Energy Conversion Jun. 1992, No. 2, pp. 322–329.
Power Electronics and Variable Frequency Drives; B. Bimal; IEEE Industrial Electronics—Technology and Applications, 1996, pp. 356.
Properties of High Plymer Cement Mortar; M. Tamai et al; *Science & Technology in Japan,* No. 63 ; 1977, pp 6–14.
Weatherability of Polymer–Modified Mortars after Ten–Year Outdoor Exposure in Koriyama and Sapporo; Y. Ohama et al; *Science & Technology in Japan No. 63;* 1977, pp 26–31.
SMC Powders Open New Magnetic Applications; M. Persson (Editor); *SMC Update,* vol. 1, No. 1, Apr. 1997.
Characteristics of a laser triggered spark gap using air, Ar, CH4,H2, He, N2, S56 and Xe, W.D. Kimura et al; Journal of Applied Physics, vol. 63, No. 6, Mar. 15, 1988, p. 1882–1888.
Low–intensy laser triggering of rail–gaps with magnesium–aerosol switching–gases, W. Frey; 11th International Pulse Power Conference, 1997, Baltimore, USA Digest of Technical Papers, p. 322–327.
Shipboard Electrical Insulation; G. L. Moses, 1951, pp2&3.
ABB Elkrafthandbok; ABB AB; ; pp274–276.
Elkraft teknisk Handbok, 2 Elmaskiner; A. Alfredsson et al; 1988, pp 121–123.
High Voltage Cables in a New Class of Generators Powerformer; M. Leijon et al; Jun. 14, 1999; pp1–8.
Ohne Transformator direkt ins Netz; Owman et al, ABB, AB; Feb. 8, 1999; pp48–51.
Submersible Motors and Wet–Rotor Motors for Centrifugal Pumps Submerged in the Fluid Handled; K. Bienick, KSB; pp9–17.
High Voltage Generators; G. Beschastnov et al; 1977; vol. 48. No. 6 pp1–7.
Eine neue Type von Unterwassemotoren; Electrotechnik und Maschinebam, 49; Aug. 1931; pp2–3.
Problems in design of the 110–5OokV high–voltage generators; Nikiti t al; World Electrotechnical Congress; Jun. 21–27, 1977; Section 1. Paper #18.
Manufacture and Testing of Roebel bars; P. Mati et al; 1960, Pub. 86, vol. 8, pp 25–31.

Hydroalternators of 110 to 229 kV Elektrotechn. Obz., vol. 64, No. 3, pp132–135 Mar. 1974; A. Abramov.
Design Concepts for an Amorphour Metal Distribution Transformer; E. Boyd et al; IEEE Nov. 1984.
Neue Wege zum Bau zweipoliger Turbogeneratoren bis 2 GVA, 60kV Electrotechnik und Maschinebau Wien Janner 1972, Heft 1, Seite 1–11, G. Aichholzer.
Optimizing designs of water–resistant magnet wire; V. Kuzenev et al; Elektroteknika, vol. 59, No. 12, pp35–40, 1988.
Zur Entwicklung der Tauchpumpenmotoren; A. Schanz; KSB, pp19–24.
Direct Generation of alternating current at high voltages; R. Parsons; 4/29 IEEE Journal, vol. 67 #393, pp1065–1980.
Stopfbachslose Umsalzpumpen– ein wichtiges Element im modemen Kraftwerkbau; H. Holz, KSB 1, pp13–19, 1960.
Zur Geschichte der Brown Boveri–Synchron–Maschinen; Vierzig Jahre Generatorbau; Jan.–Feb. 1931 pp15–39.
Technik und Anwendung moderner Tauchpumpen; A. Heumann.
High capacity synchronous generator having no tooth stator; V.S. Kildishev et al; No. 1, 1977 pp11–16.
Der Asynchronmotor als Antrieb stopfbcichsloser Pumpen; E. Picmaus; Electrotechnik und Machinebay No. 78, pp153–155, 1961.
Low core loss rotating flux transformer, R. F. Krause, et al; American Institute Physics J.Appl.Phys vol. 64 #10 Nov. 1988, pp5376–5378.
An EHV bulk Power transmission line Made with Low Loss XLPE Cable; Ichihara et al.
Underground Transmission Systems Reference Book.
Power System Stability and Control; P. Kundur.
Six phase Synchronous Machine with AC and DC Stator Connections, Part II:Harmonic Studies and a proposed Uninterruptible Power Supply Scheme; R. Schiferl et al.
Six phase Synchronous Machine with AC and DC Stator Connections, Part 1: Equiv alent circuit representation and Steady–State Analysis; R. Schilferl et al.
Reactive Power Concentration; T. Peterson.
Different Types of Permanent Magnet Rotors.
Permanent Magnet Machines; K. Binns.
Hochspannungsaniagen for Wechselstrom; 97. Hochspannungsaufgaben an Generatoren und Motoren; Roth et al; pp452–455.
Hochspannungsaniagen for Wechselstrom; 97. Hochspannungsaufgaben an Generatoren und Motoren; Roth et al; Spring 1959, pp30–33.
Neue Lbsungswege zum Entwurf grosser Turbogeneratoren bis 2GVA, 60kV; G. Aicholzer, Sep. 1974, pp249–255.
Advanced Turbine–generators– an assessment; A Appleton, et al; International Conf. Proceedings, Lg HV Elec. Sys. Paris, FR, Aug.–Sep. 1976, vol. 1, Section 11–02, p. 1–9.
Fully slotless turbogenerators; E. Spooner, Proc., IEEE vol. 120 #12, Dec. 1973.
Toroidal winding geometry for high voltage superconducting alternators; J. Kirtley et al; MIT—Elec. Power Sys. Engrg. Lab for IEEE PES 2/74.
High–Voltage Stator Winding Development, D. Albright et al; Proj. Report EL339, Proj ct 1716, Apr. 1984.
Powerformer™; A giant step in power plant engineering; Owman et al; CIGRE 1998, Paper 11:1.1.
Thin Type DC/DC Converter using a coreless wire transformer; K. Onda et al; Proc. IEEE Power Electronics Spec. Conf. 6/94, pp330–334.

Development of extruded polymer insulated superconducting cable.

Transformer core losses; B. Richardson, Proc. IEEE May 1986, pp365–368.

Cloth–transformer with divided windings and tension annealed amorphous wire; T. Yammamoto et al; IEEE Translation Journal on Magnetics in Japan vol. 4, No. 9 Sep. 1989.

A study of equipment sizes and constraints for a unified power flow controller; J Bian et al; IEEE 1996.

P. Marti and R. Schuler, "Manufacturing and Testing of Roebel Bars".

M. Ichihara and F. Fukasawa, "An EHV Bulk Power Transmission Line Made with Low Loss XLPE Cable," Aug. 1992, *Hitachi Cable Review*, No. 11, pp. 3–6.

*Underground Transmission Systems Reference Book*, 1992 Edition, prepared by Power Technologies, Inc. for Electric Power Research Institute (title page).

P. Kundur, "Power System Stability and Control," *Electric Power Research Institute Power System Engineering Series*, McGraw–Hill, Inc.

R. F. Schiferl and C. M. Ong, "Six Phase Synchronous Machine with AC and DC Stator Connections, Part II: Harmonic Studies and a Proposed Uninterruptible Power Supply Scheme", *IEEE Transactions on Power Apparatus and Systems*, Vol. PAS–102, No. 8, Aug. 1983, pp. 2694–2701.

R. F. Schiferl and C. M. Ong, "Six Phase Synchronous Machine with AC and DC Stator Connections, Part I: Equivalent Circuit Representation and Steady–State Analysis", *IEEE Transactions on Power Apparatus and Systems*, Vol. PAS–102, No. 8, Aug. 1983, pp. 2685–2693.

T. Peterson, *Reactive Power Compensation*, Abb Power Systems AB, Dec. 1993.

"Different types of Permanent Magnet Rotors", a summary by ABB Corporate Research, Nov. 1997.

K. Binns, Permanent Magnet Machines, *Handbook of Electric Machines*, Chap. 9, McGraw Hill, 1987, pp. 9–1–9–25.

* cited by examiner

FIG. 4

SYNCHRONOUS COMPENSATOR PLANT

TECHNICAL FIELD

The present invention relates to electric machines intended for connection to distribution or transmission networks, hereinafter termed power networks. More specifically the invention relates to synchronous compensator plants for the above purpose.

BACKGROUND ART

Reactive power is present in all electric power systems that transfer alternating current. Many loads consume not only active power but also reactive power. Transmission and distribution of electric power per se entails reactive losses as a result of series inductances in transformers, overhead lines and cables. Overhead lines and cables also produce reactive power as a result of capacitive connections between phases and between phases and earth potential.

At stationary operation of an alternating current system, active power production and consumption must be in agreement in order to obtain nominal frequency. An equally strong coupling exists between reactive power balance and voltages in the electric power network. If reactive power consumption and production are not balanced in a suitable manner, the consequence may be unacceptable voltage levels in parts of the electric power network. An excess of reactive power in one area leads to high voltages, whereas a deficiency leads to low voltages.

Contrary to active power balance at a nominal frequencies, which is controlled solely with the aid of the active power starter of the generator, a suitable reactive power balance is obtained with the aid of both controllable excitation of synchronous generators and of other components spread out in the system. Examples of such (phase compensation) components are shunt reactors, shunt capacitors, synchronous compensators and SVCs (Static Var. Compensators).

The location of these phase compensation components in the electric power network affects not only the voltage in various parts of the electric power network, but also the losses in the electric power network since the transfer of reactive power, like the transfer of active power, gives rise to losses and thus heating. It is consequently desirable to place phase compensation components so that losses are minimized and the voltage in all parts of the electric power network is acceptable.

The shunt reactor and shunt capacitor are usually permanently connected or connected via a mechanical breaker mechanism to the electric power network. In other words, the reactive power consumed/produced by these components is not continuously controllable. The reactive power produced/consumed by the synchronous compensator and the SVC, on the other hand, is continuously controllable. These two components are consequently used if there is a demand for high-performance voltage control.

The following is a brief description of the technology for phase compensation with the aid of synchronous compensator and SVC.

A synchronous compensator is in principle a synchronous motor running at no load, i.e. it takes active power from the electric power network equivalent to the machine losses.

The rotor shaft of a synchronous compensator is usually horizontal and the rotor generally has six or eight salient poles. The rotor is usually dimensioned thermally so that the synchronous compensator, in over-excited state, can produce approximately 100% of the apparent power the stator is thermally dimensioned for (rated output) in the form of reactive power. In under-excited state, when the synchronous compensator consumes reactive power, it consumes approximately 60% of the rated output (standard value, depending on how the machine is dimensioned). This gives a control area of approximately 160% of rated output over which the reactive power consumption/production can be continuously controlled. If the machine has salient poles with relatively little reactance in transverse direction, and is provided with excitation equipment enabling both positive and negative excitation, more reactive power can be consumed than the 60% of rated output stated above, without the machine exceeding the stability limit. Modern synchronous compensators are normally equipped with fast excitation systems, preferably a thyristor-controlled static exciter where the direct current is supplied to the rotor via slip rings. This solution enables both positive and negative supply as above.

The magnetic circuits in a synchronous compensator usually comprise a laminated core, e.g. of sheet steel with a welded construction. To provide ventilation and cooling the core is often divided into stacks with radial and/or axial ventilation ducts. For large machines the laminations are punched out in segments which are attached to the frame of the machine, the laminated core being held together by pressure fingers and pressure rings. The winding of the magnetic circuit is disposed in slots in the core, the slots generally having a cross section in the shape of a rectangle or trapezium.

In multi-phase electric machines the windings are made as either single or double layer windings. With single layer windings there is only one coil side per slot, whereas with double layer windings there are two coil sides per slot. By coil side is meant one or more conductors combined vertically or horizontally and provided with a common coil insulation, i.e. an insulation designed to withstand the rated voltage of the machine to earth.

Double-layer windings are generally made as diamond windings whereas single layer windings in the present context can be made as diamond or flat windings. Only one (possibly two) coil width exists in diamond windings whereas flat windings are made as concentric windings, i.e. with widely varying coil width. By coil width is meant the distance in arc dimension between two coil sides pertaining to the same coil.

Normally all large machines are made with double-layer winding and coils of the same size. Each coil is placed with one side in one layer and the other side in the other layer. This means that all coils cross each other in the coil end. If there are more than two layers these crossings complicate the winding work and the coil end is less satisfactory.

It is considered that coils for rotating machines can be manufactured with good results up to a voltage range of 10–20 kV.

A synchronous compensator has considerable short-duration overload capacity. In situations when electromechanical oscillations occur in the power system the synchronous compensator can briefly supply reactive power up to twice the rated output. The synchronous compensator also has a more long-lasting overload capacity and is often able to supply 10 to 20% more than rated output for up to 30 minutes.

Synchronous compensators exist in sizes from a few MVA to hundreds of MVA. The losses for a synchronous compensator cooled by hydrogen gas amount to approximately 10 W/kvar, whereas the corresponding figure for air-cooled synchronous compensators is approximately 20 W/kvar.

Synchronous compensators were preferably installed in the receiving end of long racial transmission lines and in important nodes in masked electric power networks With long transmission lines, particularly in areas with little local generation. The synchronous compensator is also used to increase the short-circuit power in the vicinity of HVDC inverter stations.

The synchronous compensator is most often connected to points in the electric power network where the voltage is substantially higher than the synchronous compensator is designed for. This means that, besides the synchronous compensator, the synchronous compensator plant generally includes a step-up transformer, a busbar system between synchronous compensator and transformer, a generator breaker between synchronous compensator and transformer, and a line breaker between transformer and electric power network, see the single-line diagram in FIG. 1.

In recent years SVCs have to a great extent replaced synchronous compensators in new installations because of their advantages particularly with regard to cost, but also in certain applications because of technical advantages.

The SVC concept (Static Var. Compensator) is today the leading concept for reactive power compensation and, as well as in many cases replacing the synchronous compensator in the transmission network, it also has industrial applications in connection with electric arc furnaces. SVCs are static in the sense that, contrary to synchronous compensators, they have no movable or rotating main components.

SVC technology, is based on rapid breakers built up of semi-conductors, thyristors. A thyristor can switch from isolator to conductor in a few millionths of a second. Capacitors and reactors can be connected or disconnected with negligible delay with the aid of thyristor bridges. By combining these two components reactive power can be steplessly either supplied or extracted. Capacitor banks with different reactive power enable the supplied reactive power to be controlled in steps.

A SVC plant consists of both capacitor banks and reactors and since the thyristors generate harmonics, the plant also includes harmonic filters. Besides control equipment, a Transformer is also required between the compensation equipment and the network in order to obtain optimal compensation from the size and cost point of view. SVC plant is available in size from a Feel MVA up to 650 MVA, with nominal voltages up to 765 kV.

Various SVC plan types exist, named after how the capacitors and reactors are combined. Two usual elements that may be included are TSC or TCR. TSC is a thyristor-controlled reactive power-producing capacitor and TCR is a thyristor-controlled reactive power-consuming reactor. A usual type is a combination of these elements, TSC/TCR.

The magnitude of the losses depends much on which type of plant the SVC belongs to, e.g. a FC/TCR type (FC means that the capacitor is fixed) has considerably greater losses than a TSC/TCR. The losses for the latter type are approximately comparable with the losses for a synchronous compensator.

It should be evident from the above summary of the phase compensation technology that this can be divided into two principal concepts, namely synchronous compensation and SVC.

These concepts have different strengths and weaknesses. Compared with the synchronous compensator, the SVC has the main advantage of being cheaper. However, it also permits somewhat faster control which may be an advantage in certain applications.

The drawbacks of the SVC as compared with the synchronous compensator include:
  it has no overload capacity. In operation at its capacitive limit the SVC becomes in principle a capacitor, i.e. if the voltage drops then the reactive power production drops with the square of the voltage. If the purpose of the phase compensation is to enable transfer of power over long distances the lack of overload capacity means that, in order to avoid stability problems, a higher rated output must be chosen if SVC plant is selected than if synchronous compensator plant is selected.
  it requires filters if it includes a TCR.
  it does not have a rotating mass with internal voltage source. This is an advantage with the synchronous compensator, particularly in the vicinity of HVDC transmission.

The present invention relates to a new synchronous compensator plant.

Rotating electric machines have started to be used, for instance, for producing/consuming reactive power with the object of achieving phase compensation in a network.

The following is a brief description of this technology, i.e. phase compensation by means of synchronous compensators and other conventional technology for compensating reactive power.

Reactive power should be compensated locally at the consumption point in order to avoid reactive power being transferred to the network and giving rise to losses. The shunt reactor, shunt capacitors, synchronous compensator and SVC represent different ways of compensating for the need for reactive power in transmission and sub-transmission networks.

A synchronous compensator is in principle a synchronous motor running in neutral, i.e. it takes active power from the network, corresponding to the losses of the machine. The machine can be under-excited or over-excited in order to consume or produce reactive power, respectively. Its production/consumption of reactive power can be continuously regulated.

In over-excited state the synchronous compensator has a relatively large short-term overload capacity of 10–20% for up to 30 minutes. In under-excited state, when the machine consumes reactive power, it can normally consume approximately 60% of rated output (standard value depending on how the machine is dimensioned). This gives a control area of approximately 160% of rated output.

If the machine has salient poles with relatively little reactance in transverse direction and is provided with excitation plant enabling negative excitation, it is possible for more reactive power to be consumed than the above-stated 60% of rated output, without the machine exceeding the stability limit. Modern synchronous compensators are normally equipped with rapid excitation systems, preferably a thyristor-controlled static exciter in which the direct current is supplied to the rotor via slip rings. This solution also permits negative excitation in accordance with the above.

Synchronous compensators are used today primarily to generate and consume reactive power in the transmission network in connection with HVDC inverter stations because of the ability of the synchronous compensator to increase the short-circuiting capacity, which the SVC lacks. In recent years the SVC has replaced the synchronous compensator in new installations because of its advantages as regards cost and construction.

The present invention relates to the first-mentioned concept, i.e. synchronous compensation.

DESCRIPTION OF THE INVENTION

Against this background, one object of the invention is to provide a better synchronous compensator plant than is possible with known technology, by reducing the number of electrical components necessary when it is to be connected to high-voltage networks, including those at a voltage level or 36 kV and above.

Thanks to the fact that the winding(s) in the rotating electric machine in the synchronous compensator plant is/are-manufactured with this special solid insulation, a voltage level can be achieved for the machine which is far above the limits a conventional machine of this type can be practically or financially constructed for. The voltage level may reach any level applicable in power networks for distribution and transmission. The advantage is thus achieved that the synchronous compensator can be connected directly to such networks without intermediate connection of a step-up transformer.

Elimination of the transformer per se entails great savings in cost, weight and space, but also has other decisive advantages over a convention synchronous compensator plant.

The efficiency of the plant is increased and the losses are avoided that are incurred by the transformer's consumption of reactive power and the resultant turning of the phase angle. This has a positive effect as regards the static and dynamic stability margins of the system. Furthermore, a convention transformer contains oil, which entails a fire risk. This is eliminated in a plant according to the invention, and the requirement for various types of fire-precautions is reduced. Many other electrical coupling components and protective equipment are also reduced. This gives reduced plant costs and less need for service and maintenance.

These and other advantages result in a synchronous compensator plant being considerably smaller and less expensive than a conventional plant, and that the operating economy is radically improved thanks to less maintenance and smaller losses.

Thanks to these advantages a synchronous compensator plant according to the invention will contribute to this concept being financially competitive with the SVC concept (see above) and even offering cost benefits in comparison with this.

The fact that the invention makes the synchronous compensator concept competitive in comparison with the SVC concept therefore enables a return to the use of synchronous compensator plants. The drawbacks associated with SVC compensation are thus no longer relevant. The complicated, bulky banks of capacitors and reactors in a SVC plant are one such drawback. Another big drawback with SVC technology is its static compensation which does not give the same stability as that obtained by the inertia obtained in a rotating electric machine with its rotating e.m.f. as regards both voltage and phase angle. A synchronous compensator is therefore better able to adjust to temporary interference in the network and to fluctuations in the phase angle. The thyristors that control a SVC plant are also sensitive to displacement of the phase angle. A plant according to the invention also enables the problem of harmonics to be solved.

The synchronous compensator plant according to the invention thus enables the advantages of synchronous compensator technology over SVC technology to be exploited so that a more efficient and stable compensation is obtained at a cost superior to this from the point of view of both plant investment and operation.

The plant according to the invention is small, inexpensive, efficient and reliable, both in comparison with a conventional synchronous compensator and a SVC.

Another object of the invention is to satisfy the need for fast, continuously controllable reactive power which is directly connected to sub-transmission or transmission level in order to manage the system stability and/or dependence on rotating mass and the electro-motive force in the vicinity of HVDC transmission. The plants shall be able to supply anything from a few MVA up to thousands of MVA.

The advantage gained by satisfying said objects is the avoidance of the intermediate transformer, the reactance of which otherwise consumes reactive power. This also enables the avoidance of traditional high-power breakers. Advantages are also obtained as regards network quality since there is rotating compensation. With a plant according to the invention the overload capacity is also increased, which With the invention may be +100%. The synchronous compensator according to the invention may be given higher overload capacity in over-excited opera;ion than conventional synchronous compensators, both as regards short-during and long-duration overload capacity. This is primarily because the time constants for heating the stator are large with electric insulation of the stator winding according to the invention. However, the thermal dimensioning of the rotor must be such that it does not limit the possibilities or exploiting this overload capacity. This enables the use of a smaller machine. The control region may be longer than with existing technology.

To accomplish this the magnetic circuit in the electric machine included in the synchronous compensator plant is formed with threaded permanent insulating cable with included earth. The invention also relates to a procedure for manufacturing such a magnetic circuit.

The major and essential difference between known technology and the embodiment according to the invention is thus that this is achieved with an electric machine provided with solid insulation, the magnetic circuit(s) of the winding (s) being arranged to be directly connected via breakers and isolators to a high supply voltage of between 20 and 800 kV, preferably higher than 36 kV. The magnetic circuit thus comprises a laminated core having a winding consisting of a threaded cable with one or more permanently insulated conductors having a semiconducting layer both at the conductor and outside the insulation, the outer semiconducting layer being connected to earth potential.

To solve the problems arising with direct connection of electric machines to all types of high-voltage power networks, a machine in the plant according to the invention has a number of features as mentioned above, which differ distinctly from known technology. Additional features and further embodiments are defined in the dependent claims and are discussed in the following.

Such features mentioned above and other essential characteristics of the synchronous compensator plant and the electric machine according to the invention included therein, include the following:

The winding of the magnetic circuit is produced from a cable having one or more permanently insulated conductors with a semiconducting layer at both conductor and sheath. Some typical conductors of this type are PEX cable or a cable with EP rubber insulation which, however, for the present purpose are further developed both as regards the strands in the conductor and the nature of the outer sheath. PEX=crosslinked polyethylene (XLPE). EP=ethylene propylene.

Cables with, circular cross section are preferred, but cables with some other cross section may be used in order to obtain better packing density, for instance.

Such a cable allows the laminated core to be designee according to the invention in a new and optimal way as regards slots and teeth.

The winding is preferably manufactured with insulation in steps for best utilization of the laminated core.

The winding is preferably manufactured as a multi-layered, concentric cable winding, thus enabling the number of coil-end intersections to be reduced.

The slot design is suited to the cross section of the winding cable so that the slots are in the form of a number of cylindrical openings running axially and/or radially outside each other and having an open waist running between the layers of the stator winding.

The design of the slots is adjusted to the relevant cable cross section and to the stepped insulation of the winding. The stepped insulation allows the magnetic core to have substantially constant tooth width, irrespective of the radial extension.

The above-mentioned further development as regards the strands entails the winding conductors consisting of a number of impacted strata/layers, i.e. insulated strands that from the point of view of an electric machine, are not necessarily correctly transposed, uninsulated and/or insulated from each other.

The above-mentioned further development as regards the outer sheath entails that at suitable points along the length of the conductor, the outer sheath is cut off, each cut partial length being connected directly to earth potential.

The use of a cable of the type described above allows the entire length of the outer sheath of the winding, as well as other parts of the plant, to be kept at earth potential. An important advantage is that the electric field is close to zero within the coil-end region outside the outer semiconducting layer. With earth potential on the outer sheath the electric field need not be controlled. This means that no field concentrations will occur either in the core, in the coil-end regions or in the transition between them.

The mixture of insulated and/or uninsulated impacted strands, or transposed strands, results in low stray losses.

The cable for high voltage used in the magnetic circuit winding is constructed or an inner core/conductor with a plurality of strands, at least two semiconducting layers, the innermost being surrounded by an insulating layer, which is in turn surrounded by an outer semiconducting layer having an outer diameter in the order or 20–250 mm and a conductor area in the order of 30–3000 mm².

According to a particularly preferred embodiment of the invention, at least two of these layers, preferably all three, have the same coefficient of thermal expansion. The decisive benefit is thus achieved that defects, cracks or the like are avoided at thermal movement in the winding.

The invention also relates to a procedure for manufacturing the magnetic circuit for the electric machine included in the synchronous compensator plant. The procedure entails the winding being placed in the slots by threading the cable through the cylindrical openings in the slots.

Since the insulation system, suitably permanent, is designed so that from the thermal and electrical point of view it is dimensioned for over 36 kV, the plant can be connected to high-voltage power networks without any intermediate step-up transformer, thereby achieving the advantages referred to above.

BRIEF DESCRIPTION OF THE DRAWINGS

The invention will be described in more detail in the following detailed description of a preferred embodiment of the construction of the magnetic circuit of the electrical machine in the synchronous compensator plant, with reference to the accompanying drawings in which.

Figure 1:
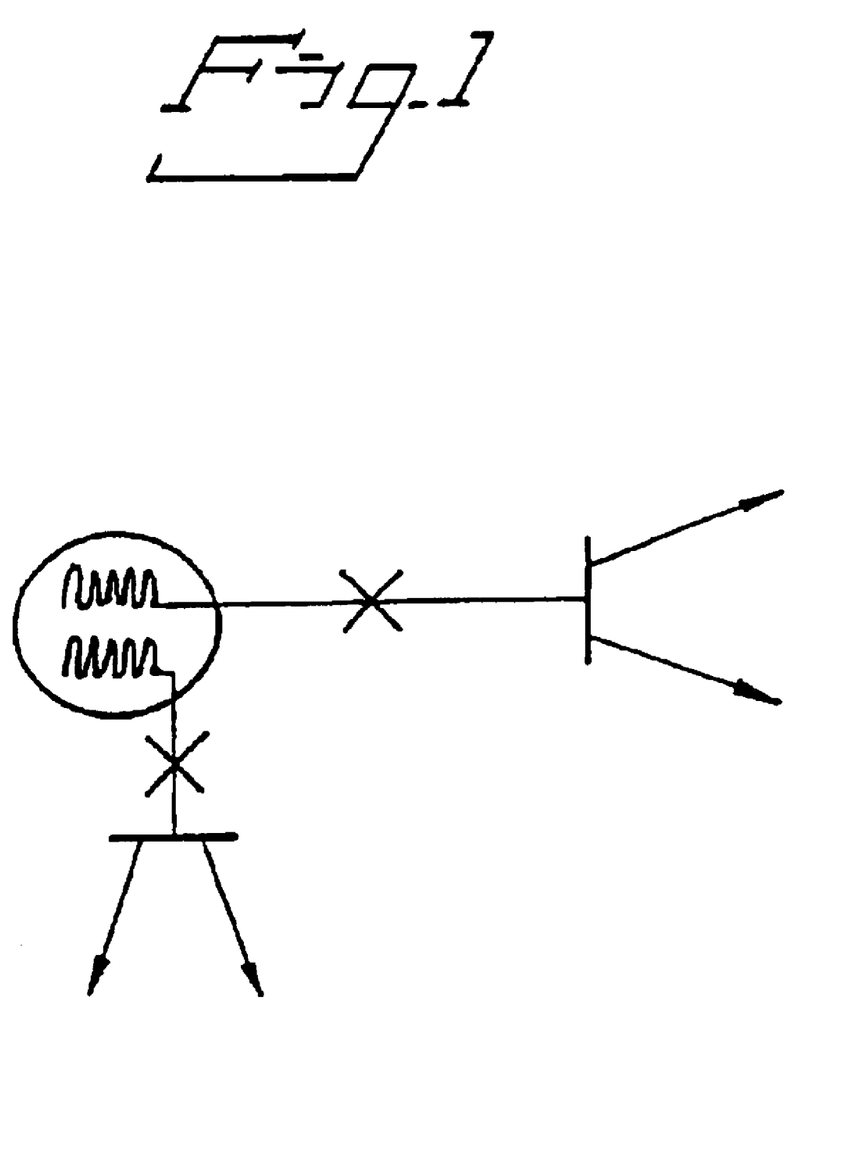
FIG. 1 shows a single line diagram of the invented synchronous compensator plant.

DESCRIPTION OF A PREFERRED EMBODIMENT:

FIG. 1 shows a single line diagram of the synchronous compensator plant according to a preferred embodiment of the invention, where the machine is arranged for direct connection to the power network, without any step-up transformer, at two different voltage levels.

Figure 2:
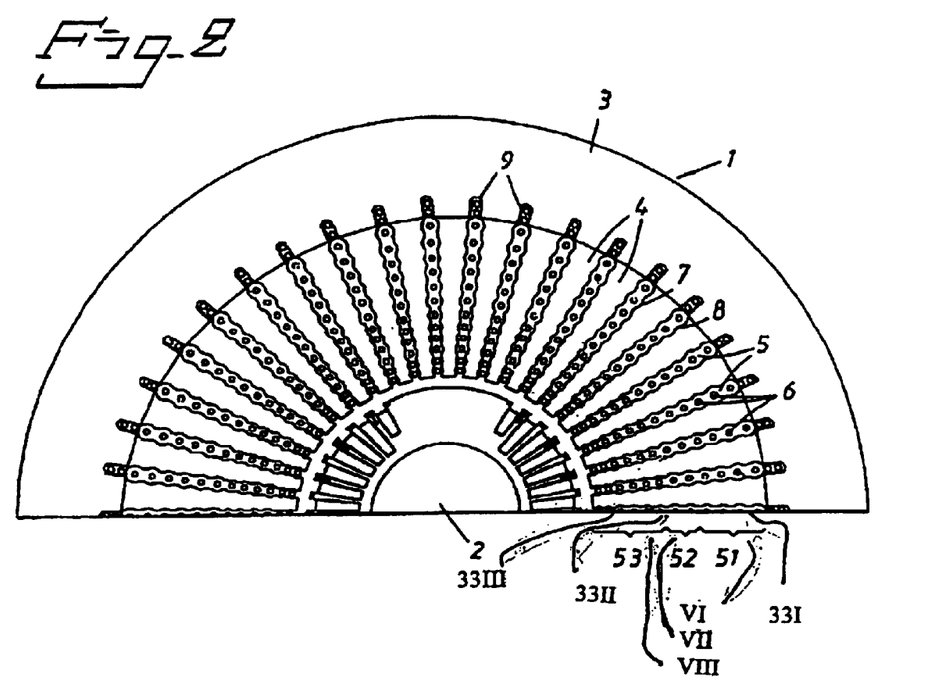
FIG. 2 shows a schematic axial end view of a sector of the stator in an electric machine in the synchronous compensator plant according to the invention.

In the schematic axial view through a sector of the stator 1 according to FIG. 2, pertaining to the electric machine included in the synchronous compensator plant, the rotor 2 of the machine is also indicated. The stator 1 is composed in conventional manner of a laminated core 1'. FIG. 1 shows a sector of the machine corresponding to one pole pitch. From a yoke part 3 of the core situated radially outermost, a number of teeth 4 extend radially in towards the rotor 2 and are separated by slots 5 in which the stator winding is arranged. Cables 6 forming this stator winding, are high-voltage cables which may be of substantially the same type as those used for power distribution, i.e. PEX cables. One difference is that the outer, mechanically-protective sheath, and the metal screen normally surrounding such power distribution cables are eliminated so that the cable for the present application comprises only the conductor and at least one semiconducting layer on each side of an insulating layer. Thus, the semiconducting layer which is sensitive to mechanical damage lies naked on the surface of the cable.

The cables 6 are illustrated schematically in FIG. 2, only the conducting central part of each cable part or coil side being drawn in. As can be seen, each slot 5 has varying cross section with alternating wide parts 7 and narrow parts 8. The wide parts 7 are substantially circular and surround the cabling, the waist parts between these forming narrow parts 8. The waist parts serve to radially fix the position of each cable. The cross section of the slot 5 also narrows radially inwards. This is because the voltage on the cable parts is lower the closer to the radially inner part of the stator 1 they are situate. Slimmer cabling can therefore be used there, whereas coarser cabling is necessary further out. In the example illustrated, cables of three different dimensions are used, arranged in three correspondingly dimensioned sections 51, 52, 53 of slots 5. An auxiliary power winding 9 is arranged outermost.

The various dimensioned sections of the slots 51, 52 and 53 correspond to several different voltage levels respectively, namely higher level VI, medium level VII, and lower level VIII. The thickness of the insulation layer 33 may be sized to correspond to the slots. The first thickness 33I corresponds to the higher voltage VI; a lesser thickness 33II corresponds to the mid level voltage VII; and a narrower thickness 33III corresponds to the lower voltage level VIII. Typically, the lower voltage level of the cable is coupled to the Y-point.

The cable 6 in FIG. 2 is illustrated with a fixed circular cross-section. However, the cross-section of the cable may be made to correspond to either; the stepwise change in slot size shown in FIG. 1. Alternatively, the cross section of the cable may decease gradually instead of stepwise. A continuously decreasing cross-section is not shown, as its configuration would be readily apparent to one of skill in the art.

Figure 3:
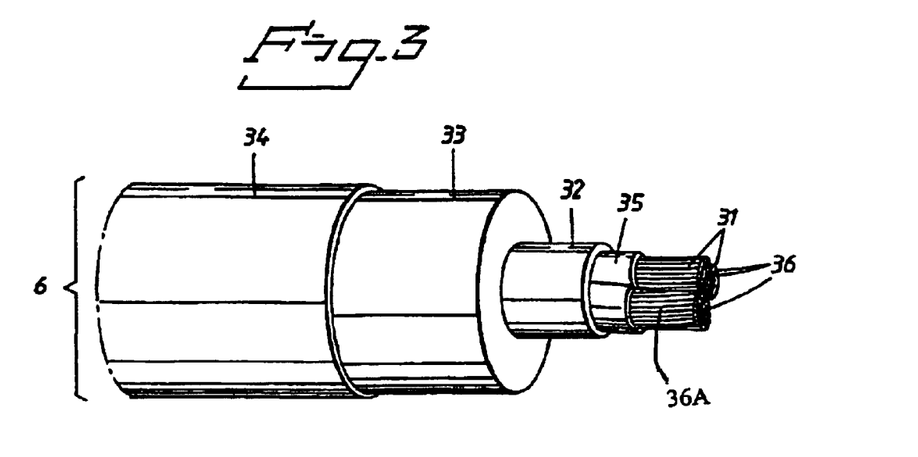
FIG. 3 shows an end view, step-stripped, of a cable used in the winding of the stator according to FIG. 2.

Further as illustrated in FIG. 3, the conductive strands 36 are formed of a plurality of insulated conductive strands 36, as shown, and at least one uninsulated strand 36A which contacts the inner semiconducting layer 32.

FIG. 3 shows a step-wise stripped end view of a high-voltage cable for use in an electric machine according to the present invention. The high-voltage cable 6 comprises one or more conductors 31, each of which comprises a number of strands 36 which together give a circular cross section of copper (Cu), for instance. These conductors 31 are arranged in the middle of the high-voltage cable 6 and in the shown embodiment each is surrounded by a part insulation 35. However, it is feasible for the part insulation 35 to be omitted on one of the four conductors 31. The number of conductors 31 need not, of course, be restricted to four, but may be more or less. The conductors 31 are together surrounded by a first semiconducting layer 32. Around this first semiconducting layer 32 is an insulating layer 33, e.g. PEX insulation, which is in turn surrounded by a second semiconducting layer 34. Thus the concept "high-voltage cable" in this application need not include any metallic screen or outer sheath of the type that normally surrounds such a cable for power distribution.

In accordance with the present invention, the synchronous compensation plant of the invention provides quadrature-axis synchronous reactance which is considerably less than the direct-axis synchronous reactance. In other words, out of phase synchronous reactance is reduced.

Figure 4:
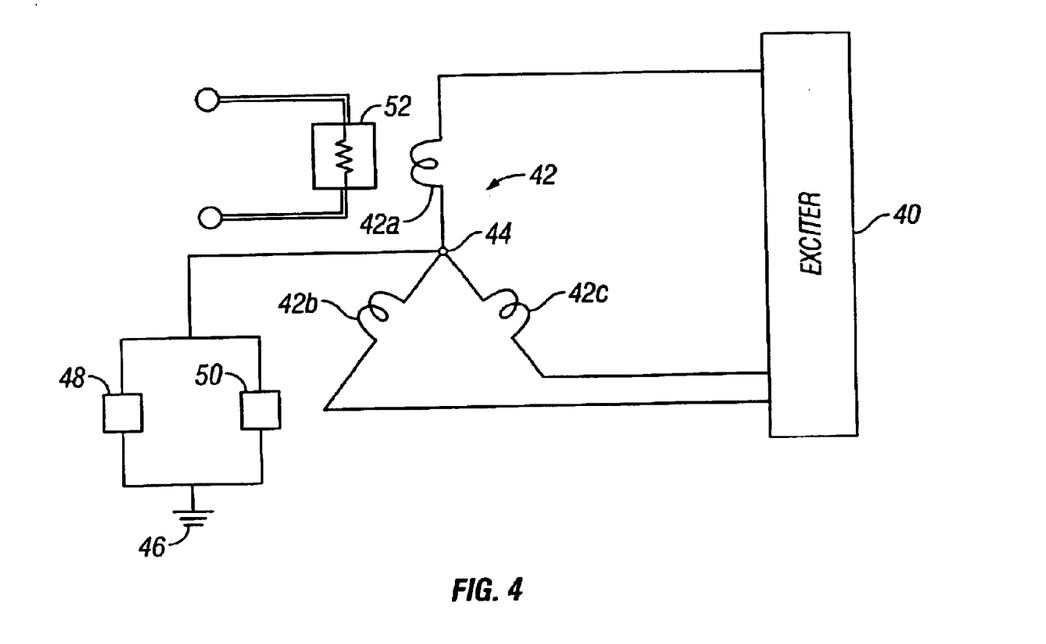
FIG. 4 is a schematic illustration of a three-phase synchronous compensator plant in accordance with the present invention.

FIG. 4 illustrates an arrangement of the invention employing three phase compensation. According to the invention, an exciter 40, which may be a positive or negative exciter, is coupled to the phases 42a, 42b and 42c of a rotating machine. The phases 42 are Y connected having a neutral point 44 which is connected to ground 46 via a suppression filter 48. A surge arrester 50 may be coupled in parallel with the suppression filter 48 as shown. A cooling means 52 employing either gas or liquid working fluid 54 may be provided in heat exchange relation with the phases 42 of the arrangement illustrated.

What is claimed is:

1. A synchronous compensator plant comprising at least one rotating electric machine including at least one flexible winding, wherein the winding comprises a conductor and an insulation system surrounding the conductor including at least one semiconducting layer forming an equipotential surface around the conductor and a solid insulation layer wherein the current carrying conductor comprises a plurality of insulated conductive strands, and at least one uninsulated conductive strand.

2. The plant as claimed in claim 1, wherein at least one of the layers and the solid insulation form a monolithic structure having substantially the same coefficient of thermal expansion.

3. The plant as claimed in claim 1, wherein the winding comprises a high voltage cable.

4. The plant as claimed in claim 3, wherein the at least one semiconducting layer comprises an inner semiconducting layer is in electrical contact with and at substantially the same potential as the conductor.

5. The plant as claimed in claim 3, wherein at least two of said layers form a monolithic structure and have substantially the same coefficient of thermal expansion.

6. The plant as claimed in claim 3, wherein the cable with solid insulation intended for high voltage have a conductor area of about between 30 and 3000 mm2 and have an outer cable diameter of about between 20 and 250.

7. The plant as claimed in claim 1, wherein said at least one semiconducting layer comprises an outer semiconducting layer connected to a selected potential.

8. The plant as claimed in claim 7, wherein the selected potential is earth potential.

9. The plant as claimed in claim 1, wherein the winding comprises a cable and the at least one semiconducting layer includes an inner semiconducting layer and an outermost semiconducting layer being arranged around each conductor, and an insulating layer of solid insulation being arranged between the inner semiconducting layer and the outermost semiconducting layer.

10. The plant as claimed in claim 1, wherein the machine has a magnetic circuit including a cooled stator operative at earth potential.

11. The plant as claimed in claim 10, wherein the electrical machine comprises a generator including a rotor.

12. The plant as claimed in claim 11, wherein the machine is connectable to a local power supply for starting said machine.

13. The plant as claimed in claim 11, wherein the machine has two or more poles.

14. The plant as claimed in claim 13, wherein the rotor and the stator are so dimensioned that at nominal voltage, nominal power factor and overexcited operation, the thermally based current limits of stator and rotor are exceeded approximately simultaneously.

15. The plant as claimed in claim 14, wherein it has 100% overload capacity at nominal voltage, nominal power factor and at over-excited operation.

16. The plant as claimed in claim 13, wherein the rotor and the stator are so dimensioned that at nominal voltage, nominal power factor and over-excited operation, the thermally based stator current limit is exceeded before the thermally based rotor current limit has been exceeded.

17. The plant as claimed in claim 1, wherein the electrical machine includes a magnetic circuit comprising a stator having a central axis and at least one slot and a stator winding located in the slot, said slot having a number of cylindrical openings each having a central axis parallel with the central axis of the stator and being disposed in the slot radially adjacent each other, each cylindrical opening having a substantially circular cross section and being separated by narrow waist parts therebetween.

18. The plant as claimed in claim 17, wherein the machine comprises a generator having a rotor and the stator including a yoke and the circular cross section of the substantially cylindrical openings for the stator winding has a decreasing radius seen from the yoke towards the rotor.

19. The plant as claimed in claim 17, wherein the stator winding has three phases and the phases of said stator winding are Y-connected.

20. The plant as claimed in claim 19, wherein the stator winding includes a Y-point insulated from earth potential or connected to earth potential via a high-ohmic impedance and protected from over-voltages by means of surge arresters.

21. The plant as claimed in claim 19, wherein the Y-point of the stator winding is earthed via a suppression filter of third harmonic type, which suppression filter is designed to greatly reduce or eliminate third harmonic currents in the electric machine and for limiting voltages and currents in the event of faults in the plant.

22. The plant as claimed in claim 21, wherein the suppression filter is protected from over-voltages by means of surge arresters, the latter being connected in parallel with the suppression filter.

23. The plant as claimed in claim 1, wherein the at least one rotating electric machine has a high voltage side and a Y-point, and wherein the insulation seen insulation system has a thickness which decreases from the high voltage side towards the Y-point.

24. The plant as claimed in claim 23, wherein the gradual decrease in the insulation thickness is stepwise or continuous.

25. The plant as claimed in claim 1, wherein the quadrature-axis synchronous reactance is considerably less than the direct-axis synchronous reactance.

26. The plant as claimed in claim 25, wherein the machine is includes an excitation system for enabling both positive and negative excitation.

27. The plant as claimed in claim 1, comprising stator and rotor circuits and cooling means therefor in which the coolant is in liquid and/or gaseous form.

28. The plant as claimed in claim 1, wherein the machine is arranged for connection to several different voltage levels.

29. The plant as claimed in claim 1, wherein the machine is connected to the power network without any step-up transformer.

30. The plant as claimed in claim 1, wherein the winding of the machine is arranged for self-regulating field control.

31. The synchronous compensator plant of claim 1, wherein the insulation system has thermal and electrical properties, which permit a voltage level in the machine exceeding 36 kV.

32. A synchronous compensator plant including a rotating high voltage electric machine comprising a stator; a rotor and a flexible winding, wherein said winding comprises a cable including at least one current-carrying conductor including a plurality of insulated strands and a lesser plurality of uninsulated strands and a cover surrounding the conductor in electrical contact therewith, including an inner layer surrounding the conductor and being in electrical contact therewith; and an insulating layer surrounding the inner layer; and an outer semiconducting layer surrounding the insulating layer, said cable forming at least one uninterrupted turn in the corresponding winding of said machine.

33. The synchronous compensator plant of claim 32, wherein the cover comprises an insulating layer surrounding the conductor and an outer layer surrounding the insulating layer, said outer layer having a conductivity for establishing an equipotential surface around the conductor.

34. The synchronous compensator plant of claim 32, wherein the cover is formed of a plurality of layers including an insulating layer and wherein said plurality of layers are joined together to form a monolithic structure and being substantially free of cracks and defects.

35. The synchronous compensator plant of claim 32, wherein the cover is in electrical contact with the conductor.

36. The synchronous compensator plant of claim 35, wherein the layers of the cover have substantially the same temperature coefficient of expansion.

37. The synchronous compensator plant of claim 32, wherein the machine is operable at 100% overload for two hours.

38. The synchronous compensator plant of claim 32, wherein the cable is operable free of sensible end winding loss.

39. The synchronous compensator plant of claim 32, wherein the winding is operable free of partial discharge and field control.

40. The synchronous compensator plant of claim 32, wherein the winding comprises multiple uninterrupted turns.

41. The synchronous compensator plant of claim 32, wherein the cover is flexible.

42. The sychronous compensator plant comprising at least one rotating electric machine including at least one flexible winding, wherein the winding comprises a current carrying conductor and an insulation system surrounding the conductor including at least one semiconducting layer forming an equipotential surface around the conductor and a solid insulation layer, and wherein the machine is arranged for connection to several different voltage levels wherein the current carrying conductor comprises a plurality of insulated conductive strands, and at least one uninsulated conductive strand.

* * * * *